(12) United States Patent
Gentile

(10) Patent No.: US 6,294,258 B1
(45) Date of Patent: Sep. 25, 2001

(54) APPLIANCE WINDOWS COATED WITH THERMOCHROMIC POLYMER DISPERSED LIQUID CRYSTAL

(75) Inventor: Michael Gentile, Cookeville, TN (US)

(73) Assignee: Tutco, Inc., Cookeville, TN (US)

(*) Notice: Subject to any disclaimer, the term of this patent is extended or adjusted under 35 U.S.C. 154(b) by 0 days.

(21) Appl. No.: 09/573,391

(22) Filed: May 18, 2000

Related U.S. Application Data

(60) Provisional application No. 60/134,607, filed on May 18, 1999.

(51) Int. Cl.$^7$ ..................................................... B23B 27/36
(52) U.S. Cl. ............................ 428/412; 219/635; 219/678
(58) Field of Search ............................ 428/412; 219/635, 219/678

(56) References Cited

U.S. PATENT DOCUMENTS

| | | |
|---|---|---|
| 4,685,771 | 8/1987 | West et al. . |
| 4,688,900 | 8/1987 | Doane . |
| 4,890,902 | 1/1990 | Doane et al. . |
| 4,983,810 | 1/1991 | Balderson . |
| 4,994,204 | 2/1991 | Doane et al. . |
| 5,004,323 | 4/1991 | West . |
| 5,240,636 | 8/1993 | Doane et al. . |
| 5,326,174 | 7/1994 | Parker . |
| 5,337,727 | 8/1994 | Borens et al. . |
| 5,404,245 | 4/1995 | Chahroudi . |
| 5,451,932 | 9/1995 | Wunderlich et al. . |
| 5,589,958 | 12/1996 | Lieb . |
| 6,001,487 | 12/1999 | Ladang et al. . |
| 6,037,572 | 3/2000 | Coates et al. . |
| 6,039,390 | 3/2000 | Agrawal et al. . |

Primary Examiner—Terressa M. Boykin
(74) Attorney, Agent, or Firm—Patton Boggs LLP

(57) ABSTRACT

An appliance window coated with a thermochromic, polymer-dispersed liquid crystal (PDLC) material allows users of appliances containing such window to view the inside chamber of the appliance without opening the appliance door. The thermochromic material on the coated window also does not detract from the overall appearance of the appliance and is composed of phase-separated droplets of liquid crystal in a light-transmissive resin matrix. The liquid crystal has an optical index of refraction in the isotropic phase that is similar to the refractive index of the resin and an index of refraction in the liquid crystalline phase that is mismatched with the refractive index of the resin. The thermochromic coating is activated by the thermal energy released by the appliance during operation. The thermal energy raises the temperature of the coating to a sufficient value so as to cause the coating to switch from an opaque state to a clear state. When the temperature is reduced below a critical value, the coating switches back to the opaque state.

18 Claims, No Drawings

APPLIANCE WINDOWS COATED WITH THERMOCHROMIC POLYMER DISPERSED LIQUID CRYSTAL

This application claims the benefit of U.S. Provisional Application No. 60/134,607 filed on May 18, 1999.

BACKGROUND OF THE INVENTION

The present invention relates to windows used in appliances. More particularly, this invention relates to appliance windows which are coated with a thermochromic polymer dispersed liquid crystal material.

Many appliances in use today have a clear glass window for allowing consumers to see what is going on inside the appliance. Unfortunately, the transparent nature of the glass window also detracts from the aesthetics of the appliance because the window does not match the design of the rest of the appliance which is usually of a particular color.

Windowless appliances, while perhaps aesthetically pleasing, have the major disadvantage of requiring consumers to open the door of the appliance to see what is going on inside. This results in a loss of heat.

Thus, it is desirable to provide an appliance window which will allow consumers to see what is going on inside the appliance without requiring the consumer to open the appliance door and further without detracting from the overall appearance of the appliance.

The use of thermochromic materials in connection with appliances is known in the art. Reference is made, for example, to U.S. Pat. Nos.: 4,983,810 (Balderson); 6,037,572 (Coates, et al.); 5,451,932 (Wunderlich et al.); and 5,326,174 (Parker). However, none of these references teaches the use of a thermochromic coating on the appliance window.

U.S. Pat. No. 5,337,727 (Borens et al.) mentions the possibility of using in an appliance window thermochrome panes the radiation permeability of which decreases as the temperature increases. However, the Borens et al. patent then teaches away from the use of such panes because "this impairs the view through the window" (col. 1, lines 56–59). Thus, Borens et al. teaches away from using thermochrome materials in an appliance window if it is desired that the view through the window not be impaired.

In recent years, certain polymer-dispersed liquid crystal ("PDLC") materials have been used as thermochromic (also referred to as temperature-responsive) materials. These particular PDLC thermochromic materials represent an improvement over previously used thermochromic materials because the PDLC materials have greater thermal stability and provide better visual contrast between the opaque and the clear states.

U.S. Pat. Nos. 4,688,900 (Doane et al.) and 4,685,771 (West et al.) each teach the use of temperature-responsive PDLC materials for use in displays but not on windows, particularly windows for use in appliances. U.S. Pat. Nos. 4,890,902 (Doane et al.); 4,994,204 (Doane et al.); 5,240,636 (Doane et al.); and 5,004,323 (West) teach the use of PDLC materials for use on windows but these materials are activated by electrical or magnetic means (i.e., these materials are "electro-responsive" or "magneto-responsive" rather than temperature-responsive) and, further, the windows on which these materials are applied are not appliance windows.

The use of temperature-responsive materials, rather than electro-responsive or magneto-responsive materials, in an appliance window is desirable because the temperature-responsive materials will be activated by the thermal energy released by the appliance during operation thereof. In other words, instead of requiring the active application of an electrical or magnetic stimulus to the material, the temperature-responsive material will be activated passively by the appliance's release of thermal energy.

Thus, it would be desirable to provide an appliance window coated with a thermochromic PDLC material.

In accordance with the foregoing, a primary object of this invention is to provide an appliance window which allows a consumer to see what is going on inside an appliance without opening the appliance door and which does not detract from the overall appearance of the appliance.

A further object of this invention is to provide an appliance window which is coated with a thermochromic material that allows a consumer to see what is going on inside an appliance without opening the appliance door and which does not detract from the overall appearance of the appliance.

Another object of this invention is to provide the aforementioned coated appliance window wherein the thermochromic material is a polymer-dispersed liquid crystal material having good thermal stability and which is capable of providing a good visual contrast between the opaque and transparent states of the material.

A still further object of this invention is to provide an appliance having a window coated with the thermochromic material having the features described in the foregoing objects.

These and other objects are achieved in the present invention.

SUMMARY OF THE INVENTION

The present invention provides appliance windows coated with a PDLC thermochromic material. The invention also provides appliances containing windows coated with such material.

The PDLC material used in the present invention is composed of phase-separated droplets of liquid crystal in a light-transmissive resin matrix and is capable of being thermally activated to cause the material to be reversibly switched between a light-scattering mode and a light-transmissive mode. The liquid crystal used in the present invention has an optical index of refraction in the isotropic phase that is similar to the refractive index of the resin and an index of refraction in the liquid crystalline phase that is mismatched with the refractive index of the resin.

The liquid crystal may contain a suitable dye to render the thermochromic material and the window in which it is disposed the same color as the rest of the appliance.

Non-limiting examples of appliances which can contain an appliance window coated with the aforementioned thermochromic material include baking ovens, toasters, clothes dryers, and the like.

The appliance window provided by the present invention differs from conventional appliance windows in that the window of this invention is only visible when it is at or above a certain temperature. When the appliance containing the window of this invention is below a certain temperature, the window will blend in with the color of the rest of the appliance. However, when the appliance is in operation and starts to heat up, the window will become transparent when a certain, predetermined temperature is reached. When the window becomes transparent, the consumer will be able to look inside the appliance without opening the door of the appliance as long as the temperature stays at or above the predetermined level. Once the temperature drops below the predetermined value, the window will turn back to the color of the appliance.

Therefore, the appliance window of this invention does not detract from the overall aesthetic appeal of the appliance and allows the consumer to view the inside chamber of the appliance without opening the appliance door.

DETAILED DESCRIPTION OF THE INVENTION

One aspect of the present invention is directed to an appliance window coated with a PDLC (polymer-dispersed liquid crystal) material which is thermochromic (i.e., temperature-responsive) in nature. The PDLC material used in this invention is capable of being thermally activated to cause the material to be reversibly switched between a light-scattering mode and a light-transmissive mode.

A further aspect of the present invention is directed to appliances containing a window coated with the aforementioned thermochromic PDLC material. As used herein, the term "appliance" is meant to include any device having an inner chamber that can be heated to an elevated temperature and which is separated from the outer environment by a partition, e.g., a door, containing a window. Non-limiting examples of appliances which can be provided with the thermochromic-coated window of this invention include, e.g., baking ovens, toasters, washing machines, clothes dryers, and the like.

The thermochromic PDLC material used in the present invention is composed of droplets of liquid crystal uniformly dispersed in a clear or light-transmitting resin matrix. The liquid crystal is selected so that its optical index of refraction in the isotropic phase has a value similar to the optical index of refraction of the clear resin so that light incident upon the PDLC material will pass readily through it unscattered. In this phase, the PDLC material will be clear. The liquid crystal is further selected so that in its liquid crystalline phase, its index of optical refraction (i.e., the extraordinary index of refraction) is different from that of the isotropic phase and that of the resin matrix so that incident light will be scattered by the liquid crystal. The mismatch between the index of refraction of the resin matrix and that of the liquid crystal and the light-scattering properties of the liquid crystal droplets cause the PDLC material to scatter light and, therefore, appear opaque.

Suitable temperature-responsive (i.e., thermochromic) PDLC materials for use in the present invention and methods for making them are taught in U.S. Pat. Nos. 4,688,900 and 4,685,771, both of which are hereby incorporated by reference herein in their entirety.

Preferred liquid crystals for use in the present invention are of the nematic type or those which behave as nematic type. Most preferably, the liquid crystal used in the present invention is a cyanobiphenyl liquid crystal. A particularly suitable cyanobiphenyl liquid crystal is a mixture containing 4'-n-pentyl-4'-cyanobiphenyl, 4'-n-propoxy-4-cyanobiphenyl, 4'-n-pentoxy-4-cyanobiphenyl, 4'-n-octyloxy-4-cyanobiphenyl, and 4'-n-pentyl-4-cyanoterphenyl. Most preferably, such mixture will contain about 43% by weight of 4'-n-pentyl-4'-cyanobiphenyl, about 17% by weight of 4'-n-propoxy-4-cyanobiphenyl, about 13% by weight of 4'-n-pentoxy-4-cyanobiphenyl, about 17% by weight of 4'-n-octyloxy-4-cyanobiphenyl, and about 10% by weight of 4'-n-pentyl-4-cyanoterphenyl.

In preferred embodiments of the present invention, the liquid crystal will have dissolved therein a suitable dye so that, in its opaque state, the thermochromic coating (and, thus, the window) will be the same color as the rest of the appliance. Suitable dyes include but are not limited to pleochroic, dichroic and isotropic dyes. Typically, such dye will be present in a proportion of about 1.5% by weight of the dye to about 98.5% by weight of the liquid crystal.

Suitable materials for use in the resin matrix are disclosed, e.g., in U.S. Pat. Nos. 4,685,771; 4,994,204; and 4,890,902; all of which are hereby incorporated by reference herein in their entirety.

Non-limiting examples of suitable resins include, e.g., transparent epoxy, polyurethane, vinyl, acrylic, polycarbonate, polyester, polyamide, hydrocarbyl, and cellulosic polymers and copolymers.

The resin matrix may further contain a wide variety of ingredients that will harden together to form the matrix, such as, e.g., monomers, prepolymers, oligomers, curing agents and cross-linking agents, as well as compatible and hardenable mixtures of preformed thermoplastic matrix materials themselves.

Epoxy resins are particularly useful. A preferred resin matrix for use in this invention is formed from a two-component composition, composed of a mixture of epichlorohydrin and bisphenol A (part A) and a curing agent (part B). Other useful epoxy resins are those that can be cured by ultraviolet (UV) radiation.

The PDLC material used in the present invention may be prepared by dissolving the liquid crystal in the uncured resin and then curing the resin so that droplets of liquid crystal spontaneously form and are uniformly dispersed throughout the matrix. When prepared in this manner, the liquid crystal droplets have observed to be of uniform size and spacing and to have a diameter ranging upward from about 0.2 microns depending primarily upon the curing procedure and the specific materials used.

One particularly preferred method of making the PDLC material used in the present invention uses a two-component epoxy material and a liquid crystal mixture. Part A of the two-component epoxy material is an equimolar mixture of bisphenol A and epichlorohydrin, while part B is a fatty polyamine curing agent. The liquid crystal mixture preferably contains a mixture composed of 4'-n-pentyl-4'-cyanobiphenyl, 4'-n-propoxy-4-cyanobiphenyl, 4'-n-pentoxy-4-cyanobiphenyl, 4'-n-octyloxy-4-cyanobiphenyl, and 4'-n-pentyl-4-cyanoterphenyl. Most preferably, such mixture will contain about 43% by weight of 4'-n-pentyl-4'-cyanobiphenyl, about 17% by weight of 4'-n-propoxy-4-cyanobiphenyl, about 13% by weight of 4'-n-pentoxy-4-cyanobiphenyl about 17% by weight of 4'-n-octyloxy-4-cyanobiphenyl, and about 10% by weight of 4'-n-pentyl-4-cyanoterphenyl.

Parts A and B of the epoxy material and the liquid crystal mixture are most preferably mixed in equal proportions by volume according to the prescription 33⅓ part A, 33⅓ part B and 33⅓ part liquid crystal mixture.

The liquid crystal readily dissolves in the uncured resin so that only gentle mixing (for about 3 minutes) is necessary to form a homogenous solution. In order to remove air bubbles which may appear during mixing, the solution can either be centrifuged for about 1 minute or placed in an evacuation chamber prior to curing.

As the liquid crystal-resin solution is cured, the resin begins to solidify. As solidification of the resin occurs, the liquid crystal molecules become immiscible in the resin and aggregate into droplets. When the resin is fully solidified, pockets or droplets of liquid crystals in the liquid crystalline phase are found entrapped within the solid phase. The droplets appear to be uniformly dispersed throughout the solid and spherical in shape. The size, shape and spacing of the droplets depend upon a number of factors such as the temperature at which the resin is cured, the types of resin and liquid crystal material used, the relative amounts of those materials, and the manner and rate of curing.

As stated previously herein, a second aspect of the present invention is directed to an appliance containing the thermochromic-coated window of this invention.

Windows for use in appliances are well known in the art. Generally, such windows are mounted on the front doors of the appliances, particularly in the case of baking ovens, clothes dryers, and the like. In the case of toasters, the window is preferably disposed in a front face of the toaster.

In preparing a thermochromic-coated appliance window of the present invention, the uncured liquid crystal-resin material described above is spread uniformly on the glass panel or other transparent substrate (e.g., polycarbonate) constituting the window and then cured. Curing times vary but can range from about 24 hours to about 48 hours. The thickness of the thernochromic coating on the window preferably ranges from about 20 to about 50 micrometers, more preferably about 25 micrometers.

In the present invention, the thermochromic material can be applied to an appliance window in several ways. For example, if the appliance window is composed of a glass pane, the thermochromic material can be applied directly onto the pane. Alternatively, the thermochromic material can be applied onto a transparent film, e.g., polycarbonate, and the resulting two-layer structure then applied to the glass pane. If the appliance window is made up of two or more layers of glass or transparent plastic, the thermochromic material can be placed between the layers.

In the present invention, the thermochromic-coated side of the appliance window will preferably be disposed toward the outside of the appliance rather than toward the appliance's inner chamber.

During its operation, the appliance (e.g., a baking oven or toaster) will generate thermal energy. This thermal energy will cause sufficient heat to be applied to the thermochromic coating on the window of the appliance so as to raise the temperature of the coating to a critical level. Temperatures at and above this critical level induce in said coating a transition from the liquid crystalline, light-scattering state to the isotropic, light-transmissive state, thereby causing the thermotropic coating to switch from an opaque state to a clear state. When the temperature of the coating is decreased to a value below the critical level, the coating will switch from the clear state back to the opaque state.

In preferred embodiments of the invention, the critical temperature at or above which the thermochromic coating will switch from opaque to clear and below which the coating will switch from dear to opaque is about 80° C.

What is claimed is:

1. A window for use in an appliance, the window being coated with a thermochromic polymer-dispersed liquid crystal material comprising phase-separated droplets of a liquid crystal in a light-transmissive resin matrix, wherein said liquid crystal has an optical index of refraction in an isotropic phase that is similar to the refractive index of the resin and an index of refraction in an liquid crystalline phase that is mismatched with the refractive index of the resin, said thermochromic material being capable of being thermally activated to cause the material to be reversibly switched between a light-scattering mode and a light-transmissive mode.

2. A window according to claim 1, wherein said liquid crystal comprises a dye sufficient to render the liquid crystalline phase of the thermochromic material the same color as the appliance.

3. A window according to claim 1, wherein the liquid crystal is nematic.

4. A window according to claim 1, wherein the liquid crystal comprises a cyanobiphenyl.

5. A window according to claim 1, wherein the resin is selected from the group consisting of epoxy, polyurethane, vinyl, acrylic, polycarbonate, polyester, polyamide, hydrocarbyl, and cellulosic polymers and copolymers.

6. A window according to claim 1, wherein the window comprises a glass substrate on which said thermochromic material is disposed.

7. A window according to claim 1, wherein the window comprises a clear plastic substrate on which said thermochromic material is disposed.

8. A window according to claim 1, wherein the window comprises a plurality of transparent glass and/or plastic layers, wherein the thermochromic material is disposed between two or more of said layers.

9. A window according to claim 1, wherein the appliance is selected from the group consisting of baking ovens, toasters, clothes dryers and washing machines.

10. An appliance containing a window coated with a thermochromic polymer-dispersed liquid crystal material comprising phase-separated droplets of a liquid crystal in a light-transmissive resin matrix, wherein said liquid crystal has an optical index of refraction in an isotropic phase that is similar to the refractive index of the resin and an index of refraction in an liquid crystalline phase that is mismatched with the refractive index of the resin, said thermochromic material being capable of being thermally activated to cause the material to be reversibly switched between a light-scattering mode and a light-transmissive mode.

11. An appliance according to claim 10, wherein said liquid crystal comprises a dye sufficient to render the liquid crystalline phase of the thermochromic material the same color as the appliance.

12. An appliance according to claim 10, wherein the liquid crystal is nematic.

13. An appliance according to claim 10, wherein the liquid crystal comprises a cyanobiphenyl.

14. An appliance according to claim 10, wherein the resin is selected from the group consisting of epoxy, polyurethane, vinyl, acrylic, polycarbonate, polyester, polyamide, hydrocarbyl, and cellulosic polymers and copolymers.

15. An appliance according to claim 10, wherein the window comprises a glass substrate on which said thermochromic material is disposed.

16. An appliance according to claim 10, wherein the window comprises a clear plastic substrate on which said thermochromic material is disposed.

17. An appliance according to claim 10, wherein the window comprises a plurality of transparent glass and/or plastic layers, wherein the thermochromic material is disposed between two or more of said layers.

18. An appliance according to claim 10, wherein the appliance is selected from the group consisting of baking ovens, toasters, clothes dryers and washing machines.

* * * * *